United States Patent
Li et al.

(10) Patent No.: US 9,519,310 B2
(45) Date of Patent: Dec. 13, 2016

(54) DISPLAY METHOD AND TERMINAL FOR CHANGING DISPLAYED CONTENT BASED ON THE DEVICE ORIENTATION

(75) Inventors: Xuelian Li, Beijing (CN); Yan Li, Beijing (CN)

(73) Assignees: BEIJING LENOVO SOFTWARE LTD., Haidian District, Beijing (CN); LENOVO (BEIJING) CO., LTD., Haidian District, Beijing (CN)

( * ) Notice: Subject to any disclaimer, the term of this patent is extended or adjusted under 35 U.S.C. 154(b) by 79 days.

(21) Appl. No.: 13/520,218

(22) PCT Filed: Dec. 28, 2010

(86) PCT No.: PCT/CN2010/080383
§ 371 (c)(1),
(2), (4) Date: Jul. 2, 2012

(87) PCT Pub. No.: WO2011/079781
PCT Pub. Date: Jul. 7, 2011

(65) Prior Publication Data
US 2013/0021275 A1    Jan. 24, 2013

(30) Foreign Application Priority Data
Dec. 31, 2009    (CN) .......................... 2009 1 0244584

(51) Int. Cl.
G06F 1/16        (2006.01)
G06F 3/0482   (2013.01)
G06F 3/0488   (2013.01)

(52) U.S. Cl.
CPC ........... *G06F 1/1626* (2013.01); *G06F 3/0482* (2013.01); *G06F 3/0488* (2013.01); *G06F 2200/1614* (2013.01)

(58) Field of Classification Search
CPC .... G06F 1/1626; G06F 3/0482; G06F 3/0488; G06F 2200/1614; G06F 3/017; H04N 5/765
See application file for complete search history.

(56) References Cited

U.S. PATENT DOCUMENTS

2006/0045462 A1* 3/2006 Poslinski ........................ 386/46
2007/0252202 A1   11/2007 Park et al.
(Continued)

FOREIGN PATENT DOCUMENTS

CN        101063928        10/2007
CN        201156246        11/2008
(Continued)

OTHER PUBLICATIONS 200910244584.6 Chinese Office Action dated Dec. 6, 2010 including English translation (15 pages).
(Continued)

*Primary Examiner* — Larry Sternbane
*Assistant Examiner* — Sepehr Azari
(74) *Attorney, Agent, or Firm* — Brinks Gilson & Lione; G. Peter Nichols

(57) ABSTRACT

A display terminal has a rectangle display screen with a long side and a short side and has two states, a first state in which only the short side is parallel to a horizontal plane and a second state in which only the long side is parallel to the horizontal plane. A display method includes generating a first display command when the terminal is detected to be in the first state and generating a second display command when the terminal is detected to be in the second state.

6 Claims, 9 Drawing Sheets

(56) References Cited

U.S. PATENT DOCUMENTS

| | | |
|---|---|---|
| 2008/0158170 A1 | 7/2008 | Herz et al. |
| 2008/0165152 A1* | 7/2008 | Forstall ................ G06F 1/1626 |
| | | 345/173 |
| 2008/0309679 A1 | 12/2008 | Chang |
| 2009/0002335 A1* | 1/2009 | Chaudhri ...................... 345/173 |
| 2009/0207184 A1 | 8/2009 | Laine et al. |
| 2011/0164057 A1* | 7/2011 | Prabhu .......................... 345/650 |

FOREIGN PATENT DOCUMENTS

| | | |
|---|---|---|
| CN | 101325052 | 12/2008 |
| CN | 101882050 | 11/2010 |

OTHER PUBLICATIONS

PCT/CN2010/080383 International Preliminary Report on Patentability dated Jul. 4, 2012 (6 pages).
PCT/CN2010/080383 International Search Report dated Apr. 7, 2011 (2 pages).

* cited by examiner a state which the terminal is in is detected —101 when it is detected that the terminal is in the first state, a first display command is generated, and in accordance with the first display command, the display screen displays a first part of the data information of at least one object(s); when it is detected that the terminal is in the second state, a second display command is generated, and in accordance with the second display command, the display screen displays a second part of the data information of at least one object(s) —102

FIG. 3

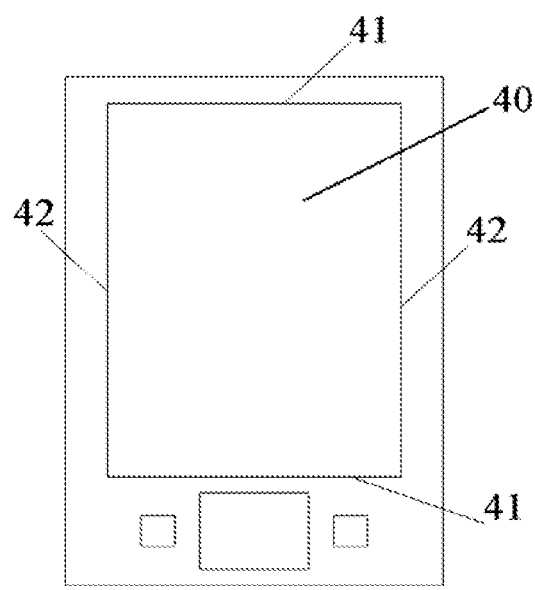

FIG. 4a

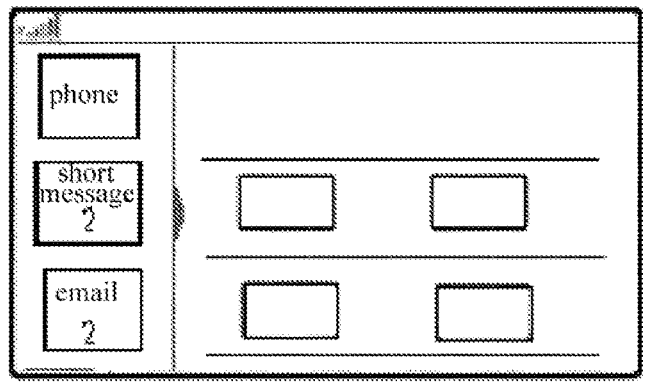

FIG. 10b a state which the terminal is in is detected, and when the terminal is at the second state, the contact point position or the contact point motion locus on touch device is acquired. ⎯501 when the contact point position or the contact point motion locus satisfies the preset condition, the contact information of the first contact currently displayed is switched to the contact information of the second contact for display ⎯502

FIG. 11

DISPLAY METHOD AND TERMINAL FOR CHANGING DISPLAYED CONTENT BASED ON THE DEVICE ORIENTATION

TECHNICAL FIELD

This invention relates to a field of display apparatus technology, particularly to a display method and a terminal.

BACKGROUND

With rapid development of mobile communication technology, network technology, liquid crystal display technology and the like, it is common to inquire information resources through some handheld display apparatus, and it is very convenient to carry and use this kind of small-scale display apparatus, such as mobile phone, MP4, handheld computer and the like.

In order to facilitate user's inquiry and operation, various information can be set for a certain object for display; for example, for a certain contact in an contact list, a first display information can be set as index (abstract) information (such as name) of the contact, and a second display information also can be set to include detailed information of the contact, such as phone number, email address, company that the contact belongs to and position in the company. However, with the increase in different types of display information of the same object, it becomes increasingly important to simplify a switching display operation between display information so as to improve user's experience.

Still taking contact list of a mobile phone as an example, an explanation will be made for a display method of different display information in the prior arts. The contact list generally stores a plurality of contacts (objects), and each of the contacts includes a plurality types of display information, which for example can be a list formed by names of a plurality of contacts as shown in FIG. 1, and also can be a business card containing detailed information of the contact as shown in FIG. 2. When a switching is performed between two types of display information, it is required to click and activate one of the display information by a button or a touch screen to achieve display of the other information. This display method takes a long time to make a response, and the efficiency thereof is relatively low.

SUMMARY

The embodiments of the present invention provide a display method and a terminal which can improve switching display efficiency between different display information.

In order to address the above technology problem, the technology solution of an embodiment of the present invention includes: a display method for a terminal having a rectangle display screen, the rectangle display screen having a long side and a short side; the terminal having two states, a first state being a state in which only the short side is parallel to a horizontal plane and a second state being a state in which only the long side is parallel to the horizontal plane; the terminal having a storage device which stores at least one object(s) with data information, characterized in that the method comprises: generating a first display command when the terminal is detected to be in the first state, and in accordance with the first display command, displaying by the display screen a first part of the data information of at least one object(s); generating a second display command when the terminal is detected to be in the second state, and in accordance with the second display command, displaying by the display screen a second part of the data information of at least one object(s), wherein a first ratio of the first part with respect to the data information of the corresponding object thereof is smaller than a second ratio of the second part with respect to the data information of the corresponding object thereof.

Further, technology solution of an embodiment of the present invention also includes: displaying said first part on a preset position of the display screen when displaying the second part.

Further, the storage device stores two objects, and when the terminal is at the second state, the second part of the data information of one of the objects is displayed, the method further comprising: acquiring a touch point position or a touch point motion locus on the touch device; and displaying a second part of the data information of another one of the objects when said touch point position or touch point motion locus satisfies a preset condition.

Further, displaying by the display screen the first part of the data information of at least one object(s) comprises: displaying the first part of data information of one object on a specific position of the display screen.

Further, displaying by the display screen the second part of the data information of at least one object(s) comprises: displaying by the display screen the second part of data information of the object corresponding to the first part displayed on the specific position.

Further, the specific position of the display screen is a position of a selection frame; or a display position which is closest to the short side of the display screen.

Further, the position of the selection frame being a fixed position arranged on the display screen; or a position where the object corresponding to the second part finally displayed after the first switching is located in a process of switching the display screen from the first state to the second state in two times continuously.

Technology solution of an embodiment of the present invention includes a contact information display method used for a terminal having a rectangle display screen, the rectangle display screen having a long side and a short side; the terminal having two states, a first state being a state in which only the short side is parallel to a horizontal plane and a second state being a state in which only the long side is parallel to the horizontal plane; the terminal having a storage device which stores contact information of at least two contacts; characterized in that the method comprises: acquiring a touch point position or a touch point motion locus on the touch screen when the terminal is at the second state; switching the contact information of the first contact currently displayed to the contact information of the second contact for display, when the touch point position or the touch point motion locus satisfies the preset condition.

Technology solution of an embodiment of the present invention includes a terminal having a rectangle display screen, the rectangle display screen having a long side and a short side; the terminal having two states, a first state being a state in which only the short side is parallel to a horizontal plane and a second state being a state in which only the long side is parallel to the horizontal plane; the terminal having a storage unit for storing at least one object(s) with data information; characterized in that the terminal further comprises: a first display unit for generating a first display command when the terminal is detected to be in the first state, and displaying a first part of the data information of at least one object(s) on the display screen in accordance with the first display command; a second display unit for generating a second display command when the terminal is detected to be in the second state, and displaying a second part of the data information of at least one object(s) on the display screen in accordance with the second display command, wherein, a first ratio of the first part with respect to the data information of the corresponding object thereof is smaller than a second ratio of the second part with respect to the data information of the corresponding object thereof.

Further, the second display unit is also used for displaying the first part on the preset position of the display screen when the second part is displayed.

Further, the storage unit stores two objects, and the second display unit displays the second part of the data information of one of the objects when the terminal is at the second state; and the terminal further includes: a locus acquisition unit for acquiring the touch point position or the touch point motion locus on the touch device; wherein the second display unit further displays the second part of the data information of another one of the objects when the touch point position or the touch point motion locus satisfies the preset condition.

Further, the first display unit is further used for displaying the first part of data information of one object on the specific position of the display screen; and the second display unit is further used for displaying the second part of data information of the object corresponding to the first part displayed on the specific position.

Technology solution of an embodiment of the present invention includes a terminal having a rectangle display screen, the rectangle display screen having a long side and a short side; the terminal having two states, a first state being a state in which only the short side is parallel to a horizontal plane and a second state being a state in which only the long side is parallel to the horizontal plane; the terminal has a storage device which stores contact information of at least two contacts; characterized in that the terminal further comprises: a locus acquisition device for acquiring a touch point position or a touch point motion locus on the touch screen when the terminal is at the second state; a display device for switching the contact information of the first contact currently displayed to the contact information of the second contact for display, when the touch point position or the touch point motion locus satisfies the preset condition.

The embodiments of the present invention automatically detect the state of the terminal and generate a display command corresponding to the state, and then realize a switching display for different display information in accordance with the different display commands; this method does not need to use keys, touch screen or the like to activate display, reduces a corresponding time for display and improves display efficiency.

BRIEF DESCRIPTION OF THE DRAWINGS

FIG. 3 is a flowchart of a display method according to an embodiment of the present invention;

FIG. 4a and FIG. 4b are state schematic diagrams of a terminal according to an embodiment of the present invention;

FIG. 10a and FIG. 10b are schematic diagrams of display state of the terminal according to the third embodiment;

FIG. 11 is a flowchart of a display method for contact information according to an embodiment of the present invention;

DETAILED DESCRIPTION OF THE PREFERRED EMBODIMENTS

In order to make those skilled in the art further understand features and technical contents of the present invention, please refer to the detailed explanation and appended drawings related to the present invention. The drawings are only provided for reference and explanation and not used for limiting the present invention.

Hereinafter, the technical solution of the present invention will be described in conjunction with the appended drawings and embodiments.

Figure 1:
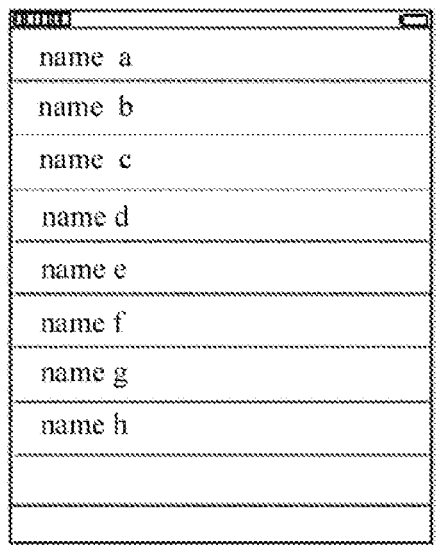
FIG. 1 is a schematic diagram for display information of a first part of data information of an object according to the prior art.
Figure 2:
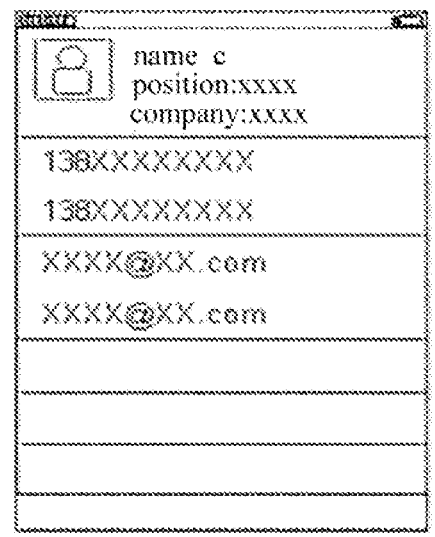
FIG. 2 is a schematic diagram for display information of a second part of data information of an object according to the prior art.
Figure 4B:
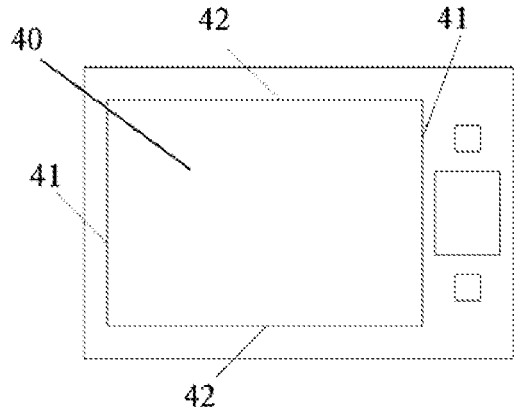

Reference is made to FIG. 3, which is a flowchart of a display method of an embodiment of the present invention. FIG. 4a and FIG. 4b are state schematic diagrams of terminal of the present invention.

This method is used for a terminal having a rectangle display screen, and the display screen has a long side and a short side; the terminal has two states, a first state being a state in which only the short side is parallel to the horizontal plane, and a second state being a state in which only the long side is parallel to horizontal plane. For example, as shown in FIG. 4a, when the terminal is vertically placed, the plane where the terminal is located is perpendicular to the horizon plane, and at this moment, two short sides 41 of the display screen 40 are parallel to the horizon plane and two long sides 42 are perpendicular to the horizon plane; this state is the first state, that is, the display screen of the terminal is at vertical screen state. When the terminal is rotated 90 degree with respect to an axis which is a normal direction of a plane where the terminal is located, as shown in FIG. 4b, the two short sides 41 are perpendicular to the horizon plane and the two long sides 42 are parallel to the horizon plane, and this state is the second state, that is, the display screen of the terminal is at horizontal screen state. This is only exemplified for explanation, and of course, it is also can be other cases.

The terminal also can have a storage device which stores at least one object(s), and the at least one object has data information. Here, the object can be a contact in a contact list, a track in a music library or the like; the data information possessed by the object can be all of the contact information of the contact, all of the related information of the track or the like.

The display method for the data information of the object in the present embodiment can include the following.

At step 101, a state which the terminal is in is detected.

This detection process can be realized by a device such as a G-Sensor set in the terminal. The G-Sensor can make detection in real time, or can make detection when the state of the terminal is changed, the process of this detection can be a preset rotation rule of the terminal. For example, if it is preset that a rotation angle of a terminal in a certain direction with respect to the original value reaches a certain threshold, the current terminal is determined to be in the first state or the second state. This step can be realized with the prior arts, and redundant description thereof will not be repeated herein.

At step 102, when it is detected that the terminal is in the first state, a first display command is generated, and in accordance with the first display command, the display screen displays a first part of the data information of at least one object(s). When it is detected that the terminal is in the second state, a second display command is generated, and in accordance with the second display command, the display screen displays a second part of the data information of at least one object(s).

If one or more objects under the current application are stored in the storage device and each of the objects has a certain data information, the data information of the respective objects can be divided, and the first and the second parts of divided data information are respectively made to correspond to the first and the second states of the terminal. When the state which the terminal is in (the first state or the second state) is detected, a display command corresponding to the current state (a first display command or a second display command) can be produced by the sensor and reported to the current application, and the part of data information corresponding to the current state (a first part or a second part) can be invoked and acquired by the current application, so as to be displayed on the display screen.

Here, in the first state, it is possible to display the first part of data information of one or more objects, and in the second state, it is also possible to display a second part of data information of one or more objects. The objects corresponding to the data information displayed in two states can be the same or not. A first ratio of the first part with respect to the data information of the corresponding object is smaller than a second ratio of the second part with respect to the data information of the corresponding object, that is, as compared with the first state, a more detailed data information can be displayed in the second state.

For example, the storage device stores information of a plurality of contacts (objects), then the name index information of the respective contacts is taken as the first part of the data information of the respective contacts, and the business card of the respective contacts, including detailed information such as phone number, email address, company to which the contact belongs, position in the company and the like, is taken as the second part of the data information of the respective contacts. When the current terminal is detected to be in the first state, the first display command is generated, and in accordance with the first display command, the display screen displays a contact name list formed by name index information of one or more contact(s). When the current terminal is detected to be in the second state, the second display command is generated, and in accordance with the second display command, the display screen can display the business card of one or more contact(s). Of course, the name index information of contacts displayed in the first state and the business card information of contacts displayed in the second state can correspond to the same contact and also can belong to different contacts, and there is no definition herein.

The embodiment of the present invention automatically detects the state of the terminal and generates a display command corresponding to the state, and then realizes a switching display for different display information in accordance with the different display commands. This method does not need to operate with keys, touch screen or the like, reduces a corresponding time for display and improves display efficiency.

Hereinafter, taking contact information as an example, a detailed explanation will be made of the method according to an embodiment of the present invention. In the following embodiment, the object stored in the storage device is the contact; one contact is one object; the data information possessed by the object is the contact information of the contact; the first part of the data information of the object is the name index information of the contact; the second part of the data information of the object is the business card of the contact, including detailed information such as contact phone number, email address, company to which the contact belongs, position in the company and the like. The ratio of the second part with respect to the contact information is greater than the ratio of the first part with respect to the contact information. Of course, the embodiment of the present invention not only can be applied to display of contact information, but also can be applied to display of information related to other application of the terminal, and the display method is similar. For example, in an application of music library, the object is a track, the first part of the data information of the object is track name index information, and the second part is information such as album to which the track belongs, time length, music producer or the like. Redundant description thereof will not be repeated herein.

Figure 5:
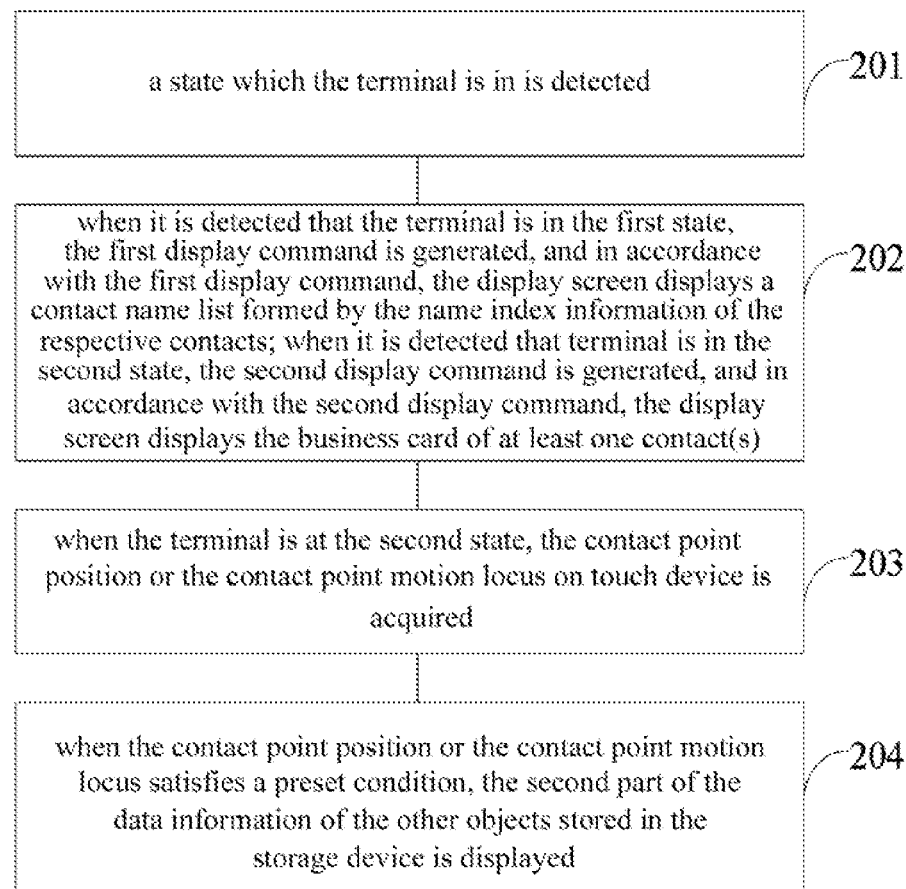
FIG. 5 is a flowchart of a method according to a first embodiment of the present invention.
Figure 6A:
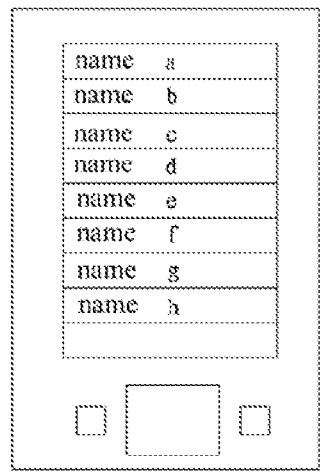
FIG. 6a to FIG. 6c are schematic diagrams of display state of the terminal according to the first embodiment.
Figure 6B:
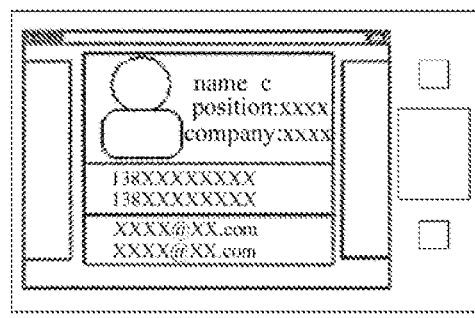
Figure 6C:
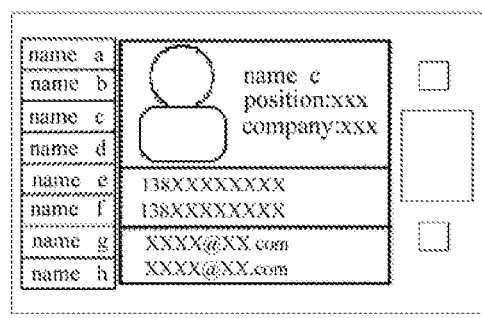

Reference is made to FIG. 5, which is a flowchart of a method according to a first embodiment of the present invention. FIG. 6a to FIG. 6c are schematic diagrams of display state of terminal of the present embodiment.

The method can include the following:

At step 201, a state which the terminal is in is detected.

At step 202, when it is detected that the terminal is in the first state, the first display command is generated, and in accordance with the first display command, as shown in FIG. 6a, the display screen displays a contact name list formed by the name index information of the respective contacts. When it is detected that terminal is in the second state, the second display command is generated, and in accordance with the second display command, as shown in FIG. 6b, the display screen displays the business card of at least one contact.

Step 201 and step 202 are similar to step 101 and step 102 of foregoing embodiment, and redundant description thereof will not be repeated herein. Of the above, the data information displayed in two states can belong to the same contact or different contacts.

In addition, when the terminal is at the second state, the first part of the data information of at least one object(s) can be displayed on the preset position of the display screen while the second part of the data information of at least one object(s) is displayed on the display screen. In this embodiment, that is, when the terminal is at the second state and the display screen displays the business card of the contact, the contact name list can be displayed on the preset position of the display screen at the same time, wherein the preset position can be a position of the display screen that is close to any side, as shown in FIG. 6c. After displaying the business card of the contact, in order to facilitate inquiry of the business card of the other contacts, the following steps can be further included.

At step 203, when the terminal is at the second state, the touch point position or the touch point motion locus on touch device is acquired.

The touch device can be formed by a display screen and a touch screen arranged in cascade in which the touch screen is positioned outside of the display screen, and also can refer to the touch screen. In this step, page turning action for the business card of the contact in a next step can be realized by acquiring the touch point position or the touch point motion locus on the touch device. A specific process for acquiring the touch point position or the touch point motion locus information on the touch screen is a prior art, and redundant description thereof will not be repeated herein.

At step 204, when the touch point position or the touch point motion locus satisfies a preset condition, the second part of the data information of other objects stored in the storage device is displayed.

In this step, if the storage device stores two objects, when the terminal is at the second state, the second part of the data information of one of the objects is displayed, and when the touch point motion locus satisfies the preset condition, the second part of the data information of another one of the objects is displayed. For a case in which a plurality of objects are stored, the display method is similar, that is, when the touch point position or the touch point motion locus satisfies the preset condition, the second part of the data information of other objects stored in the storage device is displayed. In the present embodiment, that is to display the business card of the other contacts stored in the storage device.

Whether or not the touch point position satisfies the preset condition is judged, particularly, it is possible to preset one or more operation frame(s) in the touch screen, and each of the operation frames corresponds to a different operation instruction. If the touch point position acquired in the above step is within this operation frame, a corresponding operation instruction is performed. For example, if the touch point position is within left side of the operation frame (which also can be an arrow), the business card of a contact in the storage device with the storage position prior to the current contact is displayed. If the touch point position is within right side of the operation frame (which also can be an arrow), the business card of a contact in the storage device with the storage position behind the current contact is displayed.

Whether or not the touch point motion locus satisfies the preset condition is judged, particularly, it is possible to preset a region in the touch screen. If the motion locus of the touch point acquired in the above step is within this region, it is possible to directly display the business card of other contacts stored in the storage device, and it is also possible to further judge the other parameters of the motion locus such as a vector direction. If the touch point is moved from left to right within the preset region, the business card of a contact in the storage device with the storage position prior to the current contact is displayed. If the touch point is moved from right to left within the preset region, the business card of a contact in the storage device with the storage position behind the current contact is displayed. The above process of judging whether the touch point position or the touch point motion locus satisfies the preset condition also can include other setting rules, and redundant description thereof will not be repeated herein.

In the prior art, after inquiry of the detailed information of a certain contact, if it is required to further inquire detailed information of another contact, it is required to return back to contact name information index and activate a name of the other contact in the list by clicking, touching the screen or the like so as to open the detailed information of this contact, and the operation process is cumbersome. And in this embodiment, with the above steps 203 and 204, a continuous inquiry of the business card (the detailed information) of the contact can be directly realized, which increases the inquiry efficiency and improves the user's experience.

The embodiment of the present invention decreases responding time for display and improving display efficiency by not only automatically detecting the state of the terminal and generating a display command corresponding to the state and then realizing, in accordance with the different display commands, a switching display for different display information. Moreover, the embodiment of the present invention realizes a continuous inquiry of the second part of the data information of the respective objects (that is, the detailed data information) by acquiring the touch point position or the touch point motion locus and displaying the second part of the data information of the other objects when the preset condition is satisfied, which simplifies the inquiry operation and improves the user's experience.

Figure 7:
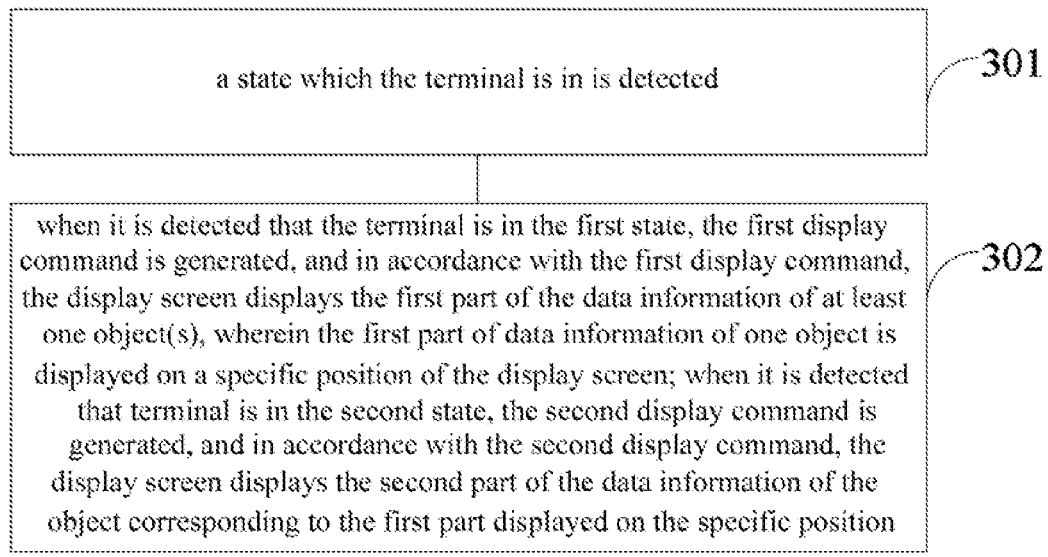
FIG. 7 is a flowchart of a method according to a second embodiment of the present invention.

Reference is made to FIG. 7, which is a flowchart of a method of a second embodiment of the present invention. FIGS. 8*a* to 8*d* are schematic diagrams of display state of the terminal of the present embodiment.

The method can include the following.

At step 301, a state which the terminal is in is detected.

At step 302, when it is detected that the terminal is in the first state, the first display command is generated, and in accordance with the first display command, the display screen displays the first part of the data information of at least one object(s), wherein the first part of data information of one object is displayed on a specific position of the display screen; when it is detected that terminal is in the second state, the second display command is generated, and in accordance with the second display command, the display screen displays the second part of the data information of the object corresponding to the first part displayed on the specific position.

In this embodiment, in the first state, the display screen displays a contact name list formed by name index information of the respective contact, wherein the name index information of one contact, "zhang san", is displayed on the specific position of the display screen. When the state of the terminal is changed, in the second state, what the display screen displays is the business card of "zhang san", that is, what is displayed in the second state is the business card of the contact corresponding to name index information displayed on the specific position.

Figure 8A:
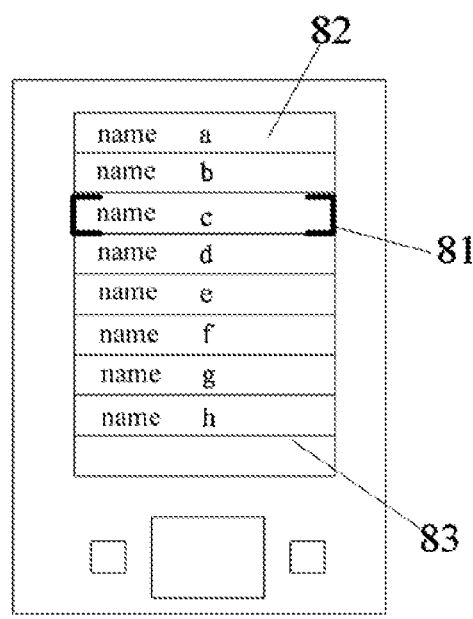
FIG. 8a to FIG. 8d are schematic diagrams of display state of the terminal according to the second embodiment.

This specific position can be a selection frame 81 set at a fixed position on the display screen, as shown in FIG. 8*a*, and also can be a display position which is closest to the short side of the display screen, such as display position 82 or display position 83, and further can be a display position which is in the middle of the display screen or other arbitrarily determined position on the display screen, wherein at the above specific position, an actual frame such as the selection frame 81 shown in FIG. 8*a* can be displayed or not.

This specific position also can be another type of the selection frame which is not set on the display screen, and the position of this selection frame can be a position where the object corresponding to the second part finally displayed after the first switching is located in the process of switching the display screen from the first state to the second state in two times continuously.

Figure 8B:
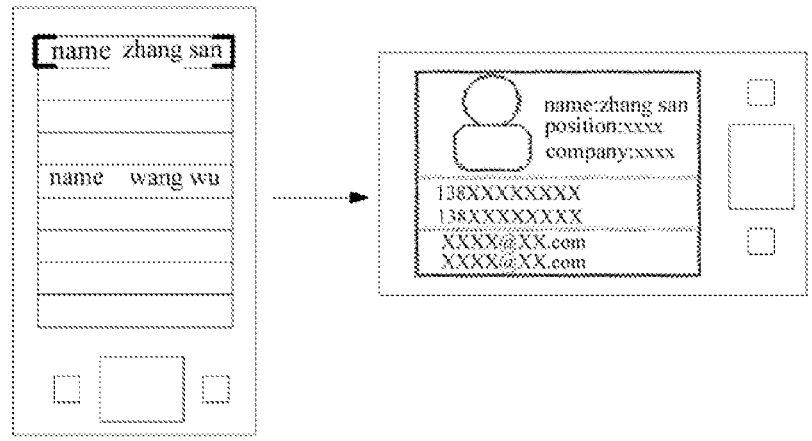
Figure 8C:
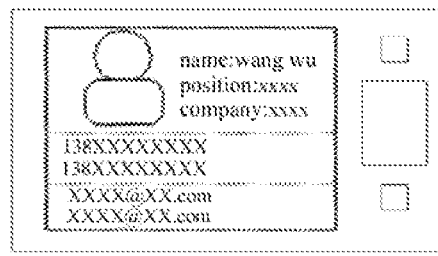
Figure 8D:
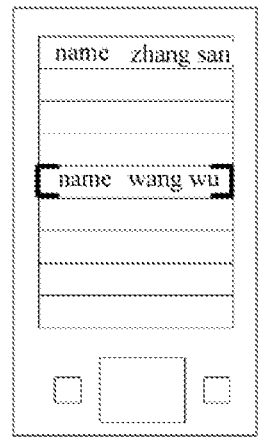

Particularly, as shown in FIG. 8*b* to FIG. 8*d*, FIG. 8*b* shows that in the process of switching the display screen from the first state to the second state for the first time, what is displayed in the second state is the business card of the first contact, that is "zhang san", in the contact name list in the first state. If no operation is performed in the second state and the second state is directly switched back to the first state, when the first state is switched back to the second state for the second time, what is to be displayed in the second state of this time is still the business card of the first contact, "zhang san" in the contact name list in the current first state, that is, what is recorded by the selection frame is the position where the contact corresponding to the business card of the contact displayed after the first switching is located.

If the operations as in step 203 and step 204 of the foregoing embodiment are carried out in the second state after the first switching from the first state to the second state for the first time, that is, after a continuous inquiry is performed on the business card of the contact, what is currently displayed is the business card of the "wang wu", as shown in FIG. 8c, and then the second state is switched back to the first state again, when the first state is switched back to the second state for the second time, as shown in FIG. 8d, what is to be displayed in the second state for this time is the business card of the contact "wang wu" in the contact name list in the current first state, that is, what is recorded by the selection frame is the position where the contact corresponding to the business card of the contact finally displayed after the first switching is located.

The above specific position of the display screen further can be other preset position, and at the above described position, the actual frame body can be displayed or not, and redundant description thereof will not be repeated herein.

The embodiment of the present invention not only automatically detects the state of the terminal and generates a display command corresponding to the state and then realizes, in accordance with the different display commands, a switching display for different display information, decreases corresponding time for display and improves display efficiency, but also can associate and match the first part displayed in the first state with the second part displayed in the second state, so as to facilitate the user to directly obtain the second part of the data information of the same object in accordance with the first part, thus facilitating the user's operation and improving the user's experience.

The method according to the embodiment of the present invention not only can be applied to the display of the above contact information, but also can be applied to the display of the information included in other applications, such as the short message, email address or the like.

Figure 9:
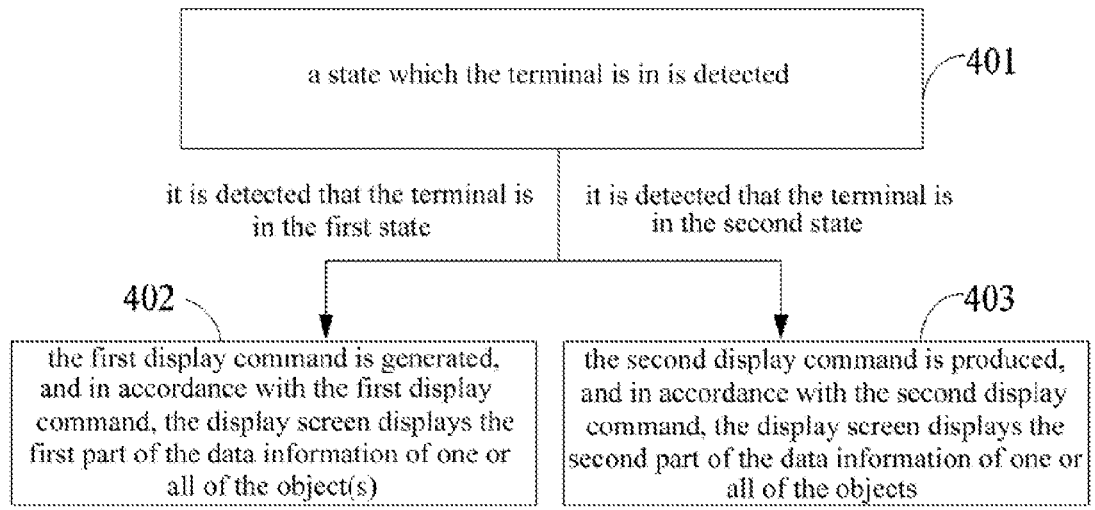
FIG. 9 is a flowchart of a method according to a third embodiment of the present invention.
Figure 10A:
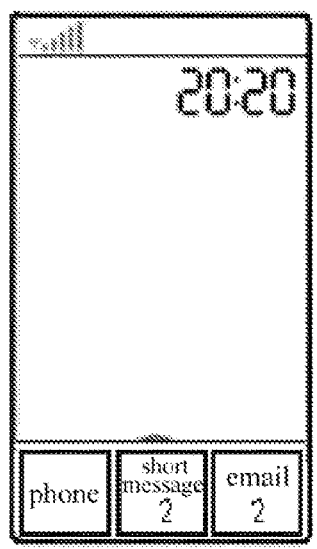

Reference is made FIG. 9, which is a flowchart of a method of a third embodiment of the present invention. FIGS. 10a and 10b are schematic diagrams of display state of the terminal of the present embodiment.

In this embodiment, the storage device of the terminal stores therein at least one object(s), and the object has data information, the object can be an object which is directly transmitted or transmitted after processing to the storage device after the information transmitted to the terminal is received by the receiving means of the terminal. When the storage device is storing, the storage device can firstly extract, in accordance with the type and state of the object to which the information belongs, the abstract information of the object as the data information for storage, then further can divide the data information (that is, the abstract information) into the first part and the second part, and a ratio of the first part with respect to the data information is smaller than that of the second part with respect to the data information.

For example, after a short message is received by the receiving means, the information data is transmitted to the storage device, and the storage device can determine the object category to which the information belongs to be the short message in accordance with this information data, and further can determine, in accordance with the source of the information, the state of this information, such as the number being 1, unread, then the storage device extracts the abstract information of the object as the data information of the object and then stores it, and divides it into two parts. For example, one object stored in the storage device is the short message, and the first part of the data information of the object is the short message being 1 (which also can include unread state), the second part is abstract of content of the short message such as sender, sending time, topic name or the like (of course, in a case where the storage capacity is permitted, this second part even can include all the contents of this short message).

When two or more information transmitted by the receiving means are received by the storage device, the process of the storage device extracting, in accordance with the type and state of the object to which the information belongs, the abstract information of the object as the data information for storage particularly can be a process of incorporating the information under the same object and extracting the abstract information of the object as data information for storage, and then dividing the incorporated data information into the first and the second parts in accordance with the type and the state of the object to which this information belongs.

For example, after receiving two short messages, the receiving means sends the information data to the storage device, and the storage device can respectively determine the object category to which the information belongs to be the short message in accordance with the data of the received information, and further can determine, in accordance with the source of the information, the state of the information. For example, the storage device respectively determine the object category to which this two information both belong to be the short message, and both of the states are number being 1, unread, the receiving means firstly incorporates the two information, such as the object being short message, the amount being 2 and the state being unread, and then extracts the abstract information of the object as data information so as to be stored and divided. For example, the first part is the short message being 2 (which also can include unread state), the second part is abstract of content of the two short messages such as sender, sending time, topic name or the like (of course, in a case where the storage capacity is permitted, this second part even can include all the contents of this short message).

After two or more pieces of information transmitted by the receiving means are received by the storage device, when the storage device determines, in accordance with the type and the state of the object to which the information belongs, that the information belongs to different object categories, the storage device can firstly incorporate the information under respective object categories, and then respectively extracts the abstract information of the respective objects as data information so as to be stored and divided. For example, the storage device stores therein two objects which respectively are short message and email, wherein the first part of the data information of the object of the short message is the short message being 2 (which also can include unread state), the second part is abstract of content of the two short messages such as sender, sending time, topic name or the like (of course, in a case where the storage capacity is permitted, this second part even can include all the contents of this short message); the first part of the data information of the object of the email is the email being 2 (which also can include unread state), the second part is abstract of content of the two emails such as sender, sending time, topic name or the like (of course, in a case where the storage capacity is permitted, this second part even can include all the contents of this email). From the above division of the object data information, it can be known that, regardless of the object, a ratio of the first part of the data information with respect to the data information is smaller than that of the second part with respect to the data information.

With respect to the display of information stored in the storage device, this method can further include the following.

At step 401, a state which the terminal is in is detected.

This step is similar to the corresponding step of the aforementioned embodiments, and redundant description thereof will not be repeated herein.

At step 402, when it is detected that the terminal is in the first state, the first display command is generated, and in accordance with the first display command, the display screen displays the first part of the data information of one or all of the object(s).

In the present embodiment, in the first state as shown in FIG. 10*a*, the display screen can only display the first part of the data information of one short message object, but also can display the first part of the data information of all objects, for example, the number of the short message being 2 and the number of the email being 2.

At step 403, when the terminal is detected to be in the second state, the second display command is produced, and in accordance with the second display command, the display screen displays the second part of the data information of one or all of the objects.

In this step, the object displayed in the second state and the object displayed in the first state can be the same or not; for example, in the first state, the first part of the data information of the short message is displayed, and in the second state, the abstract information of the email is displayed.

In the second state, the display screen can display the second part of the data information of all objects, such as the content abstract of the two short messages and the content abstract of the two emails. The content abstract may be, for example, sender, sending time, topic name or the like (of course, in a case where the display size of the display screen is permitted, this second part even can include all the contents of the short message or the email). Also, while the second part is displayed, the first part can be displayed on the preset position of the display screen as shown in FIG. 10*b*, and the second part of the data information of the object can be displayed on a corresponding position of display position of the first part of the data information of the respective objects. For example, in the drawing, at a position which is at the same horizontal line as the display position of the first part ("short message 2") of data information of the object of the short message, the second part of the data information of the object of the short message is displayed, while at a position which is at the same horizontal line as the display position of the first part ("email 2") of data information of the object of the email, the second part of the data information of the object of the email is displayed. If the display area of the display screen is permitted, a certain interval can be further arranged between the second parts of the respective objects, so as to make a distinction.

In the second state, the display screen can also display the second part of the data information of one of the objects stored in the storage device, such as the abstract information of the short message. In order to facilitate the inquiry of the second part of the data information of the other objects stored in the storage device, such as the abstract information of the email, it is possible to perform an operation similar to steps 203 and step 204 of the aforementioned embodiments, that is, to acquire the touch point position or the touch point motion locus on the touch device; when the touch point position or the touch point motion locus satisfies the preset condition, the second part of the data information of the other one of the objects stored in the storage device is displayed.

In the second state, when the display screen displays the second part of the data information of one of the objects, the object can be the object corresponding to the first part displayed on the specific position of the display screen in the first state. For example, in the first state, the first part of the data information of the short message is displayed on the specific position of the display screen, and after the terminal is rotated to the second state, the second part of the data information of the short message is displayed. The specific position can be similar to those described in the second embodiment as described above and redundant description thereof will not be repeated herein.

The embodiment of the present invention not only automatically detects the state of the terminal and generates a display command corresponding to the state and then realizes, in accordance with the different display commands, a switching display for different display information, decreases corresponding time for display and improves display efficiency, but also realizes a continuous inquiry of the second part of the data information (that is, the detailed data information) of the respective objects by acquiring the touch point position or the touch point motion locus and displaying the second part of the data information of the other objects when the preset condition is satisfied, facilitates the inquiry operation and improves the user's experience. Further, the embodiment of the present invention can associate and match the first part displayed in the first state with the second part displayed in the second state, so as to facilitate the user to directly obtain the second part of the data information of the same object in accordance with the first part, thus facilitates the user's operation and also improves the user's experience.

Referring to FIG. 11, the embodiment of the present invention also provides a display method for contact information.

This method is used for a terminal having a rectangle display screen, the rectangle display screen has a long side and a short side; the touch screen can be a general term including a display screen; the terminal has two states, a first state being a state in which only the short side is parallel to a horizontal plane and a second state being a state in which only the long side is parallel to the horizontal plane; the terminal has a storage device which stores contact information of at least two contacts.

The display method can comprise the following.

At step 501, a state which the terminal is in is detected, and when the terminal is at the second state, the touch point position or the touch point motion locus on touch device is acquired.

At step 502, when the touch point position or the touch point motion locus satisfies the preset condition, the contact information of the first contact currently displayed is switched to the contact information of the second contact for display.

The steps 501 and 502 of the present embodiment are similar to the steps 203 and 204 of the aforementioned embodiment, and the difference only lies in that, in this embodiment, the contact information displayed in the second state can be the business card of the contact, name list of the contact, the image information of the contact, or the like.

By acquiring the touch point position or the touch point motion locus and displaying information of the other contact when the preset condition is satisfied, the embodiment of the present invention realizes a continuous inquiry of information of the respective contact in the second state, facilitates the user's operation and improves the user's experience.

The above is the detailed description for the method of the embodiment of the present invention, and hereinafter, the apparatus or the apparatus for realizing the method as described above will be introduced with embodiments.

Figure 12:
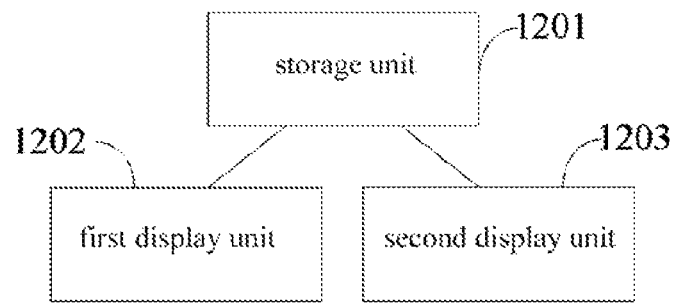
FIG. 12 is a schematic diagram of a structure of the terminal according to an embodiment of the present invention.

Reference is made to FIG. 12, which is a schematic diagram of a structure of the terminal according to an embodiment of the present invention.

This terminal has a rectangle display screen with a long side and a short side; the terminal has two states, a first state being a state in which only the short side is parallel to a horizontal plane and a second state being a state in which only the long side is parallel to the horizontal plane.

The terminal includes a storage unit 1201, a first display unit 1202 and a second display unit 1203.

The storage unit 1201 is used for storing at least one object(s), said object having data information.

The first display unit 1202 is used for generating a first display command when the terminal is detected to be in the first state, and displaying a first part of the data information of at least one object(s) on the display screen in accordance with the first display command.

The second display unit 1203 is used for generating a second display command when the terminal is detected to be in the second state, and displaying second part of the data information of at least one object(s) on the display screen in accordance with the second display command.

Here, the object stored in the storage unit 1201 can be a contact in an contact list, a track in a music library or the like. The data information possessed by the object can be all of the contact information of the contact, all of the related information of the track or the like. The data information of the object in the storage unit 1201 can further be divided into a first part and a second part respectively for display under different terminal states. A first ratio of the first part with respect to the data information of the corresponding object thereof is smaller than a second ratio of the second part with respect to the data information of the corresponding object thereof. For example, the data information of the object can be divided into a first part having relatively simple abstract information and a second part having relatively detailed information. In the terminal, a detection device for detecting the state of the terminal, such as a G-Sensor or the like, can set. In this detection device, it can be previously established a rotation rule of the terminal, for example, when it is previously established that a rotation angle of a terminal in a certain direction with respect to the original value reaches a certain threshold, it is determined that a state which the current terminal is in is the first state or the second state. When the terminal is detected to be in the first state, the first display command is generated by the first display unit 1202, and in accordance with the first display command, the display screen displays the first part of the data information of at least one object(s); when the terminal is detected to be in the second state, the second display command is generated by the second display unit 1203, and in accordance with the second display command, the display screen displays the second part of the data information of at least one object(s). The objects corresponding to the data information displayed in two states can be the same or not.

With the above units, the embodiment of the present invention automatically detects the state of the terminal and generates a display command corresponding to the state, and then realizes a switching display for different display information in accordance with the different display commands; this method does not need to use keys, touch screen or the like to operate for activating display, reduces a corresponding time for display and improves display efficiency.

In another embodiment of the terminal of the present invention, the first display unit 1202 is further used for displaying the first part of data information of one object on the specific position of the display screen; and the second display unit 1203 is further used for displaying the second part of data information of the object corresponding to the first part displayed on the specific position. This specific position can be a selection frame arranged at a fixed position on the display screen, also can be a display position which is closest to the short side of the display screen, and further can be another selection frame which is not arranged on the display screen; the position of the selection frame can be a position where the object corresponding to the second part finally displayed after the first switching is located in a process of switching the display screen from the first state to the second state in two times continuously.

The first display unit 1202 and the second display unit 1203 can associate and match the first part displayed in the first state with the second part displayed in the second state, so as to facilitate the user to directly obtain the second part of the data information of the same object in accordance with the first part, thus facilitating the user's operation and improving the user's experience.

Figure 13:
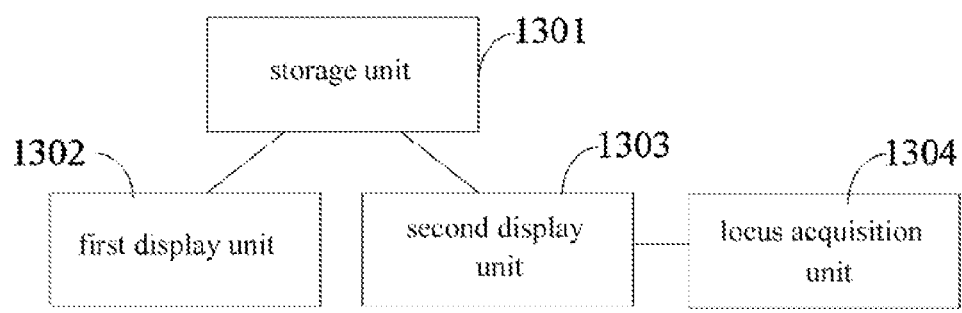
FIG. 13 is a schematic diagram of structure of the terminal according to another embodiment of the present invention.

Reference is made to FIG. 13, which is a schematic diagram of another structure of the terminal according to an embodiment of the present invention.

In this embodiment, in addition to a storage unit 1301, a first display unit 1302 and a second display unit 1303, the terminal can include a locus acquisition unit 1304.

Herein, the storage unit 1301 and the first display unit 1302 are similar to the above embodiments, and redundant description thereof will not be repeated herein.

The locus acquisition unit 1304 is used for acquiring the touch point position or the touch point motion locus on the touch device.

In addition to generating a second display command when the terminal is detected to be in the second state and displaying the second part of the data information of at least one object(s) on the display screen in accordance with the second display command, the second display unit 1302 is further used for displaying the first part on a preset position of the display screen when said second part is displayed, as shown in FIG. 6c; the second display unit 1302 is still further used for displaying the second part of the data information of the other objects stored in the storage unit 1301 when the touch point position or the touch point motion locus acquired by the locus acquisition unit 1304 satisfies the preset condition.

In this embodiment, if the storage unit 1301 stores two objects, when the terminal is at the second state, the second part of the data information of one of the objects is displayed by the second display unit 1303. After the touch point position or the touch point motion locus on the touch device is acquired by the locus acquisition unit 1304, if the touch point position or the touch point motion locus satisfies the preset condition, the second part of the data information of another one of the objects is displayed by the second display unit 1303. For a case in which a plurality of objects are stored in the storage unit 1301, the display method of the second display unit 1303 is similar, that is, when the touch point position or the touch point motion locus satisfies the preset condition, the second part of the data information of other objects stored in the storage device is displayed. Herein, with respect to a process of judging whether or not the touch point position or the touch point motion locus satisfies the preset condition by the second display unit 1303, please refer to the detailed description of the above method embodiment, and redundant description thereof will not be repeated herein.

With the storage unit 1301, the first display unit 1302 and the second display unit 1303, the embodiment of the present invention not only automatically detects the state of the terminal and generates a display command corresponding to the state and then realizes, in accordance with the different display commands, a switching display for different display information, decreases corresponding time for display and improves display efficiency, but also realizes, with acquiring by the locus acquisition unit 1304 the touch point position or the touch point motion locus and displaying by the second display unit 1303 the second part of the data information of other objects when the touch point position or the touch point motion locus satisfies the preset condition, a continuous inquiry of the second part of the data information of the respective objects (that is, the detailed data information), which simplifies the inquiry operation and improves the user's experience.

Figure 14:
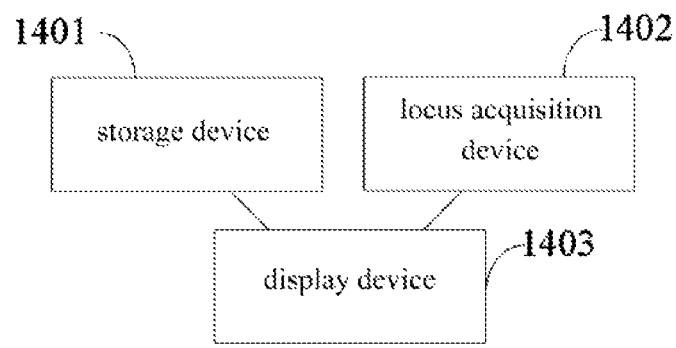
FIG. 14 is a schematic diagram of structure of the terminal according to another embodiment of the present invention.

Reference is made to FIG. 14, which is a schematic diagram of another structure of the terminal according to an embodiment of the present invention.

The terminal has a rectangle touch screen with a long side and a short side; the terminal has two states, a first state being a state in which only the short side is parallel to a horizontal plane and a second state being a state in which only the long side is parallel to the horizontal plane.

The terminal includes a storage device 1401, a locus acquisition device 1402 and a display device 1403.

The storage device 1401 stores contact information of at least two contacts.

The locus acquisition device 1402 is used for acquiring a touch point position or a touch point motion locus on the touch screen when the terminal is at the second state.

The display device 1403 is used for switching the contact information of the first contact currently displayed into the contact information of the second contact for display, when the touch point position or the touch point motion locus satisfies the preset condition.

Herein, with respect to a process of acquiring touch point position or the touch point motion locus and judging whether or not the preset condition is satisfied, please refer to the description of the above embodiment, and redundant description thereof will not be repeated herein. In this embodiment, the contact information displayed in the second state can be the business card of the contact, name list of the contact, the image information of the contact, or the like.

With the storage device 1401, the locus acquisition device 1402 and the display device 1403, the embodiment of the present invention realizes a continuous inquiry of information of the respective contact in the second state, facilitates the user's operation and improves the user's experience.

The embodiments of the present invention as described above do not constitute a limitation to the protection scope of the present invention. Any modification, equivalent alternation, improvement and the like made without departing from the spirit and principle of the present invention should be included in the protection scope of the claims of the present invention.

What is claimed is:

1. A display method used for a terminal having a rectangle display screen, the rectangle display screen having a long side and a short side; the terminal having two states, a first state being a state in which only the short side is parallel to a horizontal plane and a second state being a state in which only the long side is parallel to the horizontal plane; the terminal having a storage device which stores a plurality of objects with data information; wherein the method comprises:

generating a first display command when the terminal is detected to be in the first state, and in accordance with the first display command, displaying by the display screen a first part of the data information of a plurality of objects and the first part of the data information includes index information of the plurality of objects;

generating a second display command when the terminal is detected to be in the second state, and in accordance with the second display command, only displaying by the display screen all information of a second part of the data information of a selected one object of the plurality of objects;

wherein a first ratio of the first part with respect to the data information of the selected one object is smaller than a second ratio of the second part with respect to the data information of the selected one object; and wherein displaying by the display screen the first part of the data information of the plurality of objects comprises displaying the first part of the data information of one of the objects on a specific position of the display screen; and wherein displaying by the display screen the second part of the data information of the selected one object of the plurality of objects comprises displaying by the display screen the second part of the data information of the object corresponding to the first part displayed on the specific position, wherein when the terminal is in the second state, and in accordance with the second display command, only displaying by the display screen all information of the second part of the data information of the selected one object of the plurality of objects, the method further comprising:

acquiring a touch point position or a touch point motion locus on a touch device; and displaying a second part of the data information of another one of the objects when said touch point position or touch point motion locus satisfies a preset condition.

2. The method according to claim 1, further comprising displaying said first part on a preset position of the display screen when displaying the second part.

3. The method according to claim 1, wherein the specific position of the display screen refers to:
a position of a selection frame; or
a display position which is closest to the short side of the display screen.

4. The method according to claim 3, wherein the position of the selection frame refers to:
- a fixed position arranged on the display screen; or
- a position where the object corresponding to the second part finally displayed after a first switching is located in a process of switching the display screen from the first state to the second state in two times continuously.

5. A terminal having a rectangle display screen, the rectangle display screen having a long side and a short side; the terminal having two states, a first state being a state in which only the short side is parallel to a horizontal plane and a second state being a state in which only the long side is parallel to the horizontal plane; the terminal having a storage unit for storing a plurality of objects with data information; wherein the terminal further comprises:
- a first display unit for generating a first display command when the terminal is detected to be in the first state, and displaying a first part of the data information of the plurality of objects on the display screen in accordance with the first display command and the first part of the data information includes index information of the plurality of objects;
- a second display unit for generating a second display command when the terminal is detected to be in the second state, and only displaying all information of a second part of the data information of a selected one object of the plurality of objects on the display screen in accordance with the second display command;

wherein, a first ratio of the first part with respect to the data information of the selected one object is smaller than a second ratio of the second part with respect to the data information of the selected one object; and the first display unit is further used for displaying the first part of data information of one of the objects on the specific position of the display screen; and the second display unit is further used for displaying the second part of data information of the object corresponding to the first part displayed on the specific position, wherein the terminal further includes a locus acquisition unit for acquiring a touch point position or a touch point motion locus on a touch device; and when the terminal is in the second state and the second display unit displays all information of the second part of the data information of the selected one object of the plurality of objects on the display screen in accordance with the second display command, the second display unit further displays the second part of the data information of another one of the objects when the touch point position or the touch point motion locus satisfies a preset condition.

6. The terminal according to claim 5, wherein the second display unit is further used for displaying the first part on a preset position of the display screen when the second part is displayed.

* * * * *